United States Patent
Hastie et al.

(10) Patent No.: US 8,954,794 B2
(45) Date of Patent: Feb. 10, 2015

(54) METHOD AND SYSTEM FOR DETECTION OF LATENT FAULTS IN MICROCONTROLLERS

(75) Inventors: Neil Hastie, Lydney (GB); Simon Brewerton, Trowbridge (GB)

(73) Assignee: Infineon Technologies AG, Neubiberg (DE)

( * ) Notice: Subject to any disclaimer, the term of this patent is extended or adjusted under 35 U.S.C. 154(b) by 200 days.

(21) Appl. No.: 13/488,571

(22) Filed: Jun. 5, 2012

(65) Prior Publication Data
US 2013/0326289 A1    Dec. 5, 2013

(51) Int. Cl.
*G06F 11/00*    (2006.01)

(52) U.S. Cl.
USPC ........................... 714/11; 714/47.1

(58) Field of Classification Search
USPC ......................................... 714/11
See application file for complete search history.

(56) References Cited

U.S. PATENT DOCUMENTS

| | | | |
|---|---|---|---|
| 4,799,140 A * | 1/1989 | Dietz et al. | 700/20 |
| 5,404,465 A * | 4/1995 | Novakovich et al. | 710/110 |
| 5,854,640 A * | 12/1998 | North et al. | 345/547 |
| 5,903,717 A | 5/1999 | Wardrop | |
| 6,496,940 B1 * | 12/2002 | Horst et al. | 714/4.3 |
| 7,877,645 B2 * | 1/2011 | Meyer et al. | 714/47.1 |
| 2002/0023169 A1 * | 2/2002 | Ponzio, Jr. | 709/232 |
| 2005/0138098 A1 * | 6/2005 | Saha et al. | 708/404 |
| 2009/0037777 A1 * | 2/2009 | Meyer et al. | 714/47 |
| 2010/0070803 A1 * | 3/2010 | Carlson et al. | 714/30 |
| 2011/0283033 A1 | 11/2011 | Yamada et al. | |

FOREIGN PATENT DOCUMENTS

CN    101369241 A    2/2009

* cited by examiner

*Primary Examiner* — Kamini Patel
(74) *Attorney, Agent, or Firm* — Eschweiler & Associates, LLC

(57) ABSTRACT

Embodiments relate to systems and methods for detecting register corruption within CPUs operating on the same input data enabling non-invasive read access to and comparison of contents of at least one set of according ones of registers of different CPUs to detect corrupted registers in form of according registers with inconsistent contents.

24 Claims, 2 Drawing Sheets

METHOD AND SYSTEM FOR DETECTION OF LATENT FAULTS IN MICROCONTROLLERS

FIELD

The present invention relates generally to a method and system for detection of latent faults in microcontrollers, and, in particular, for the detection of corruption of microcontroller registers by latent faults to avoid unexpected operation of microcontrollers, for instance, high integrity microcontrollers in automotive electronic control units (ECUs).

BACKGROUND

There is a trend that modern automotive ECUs integrate more and more functionality. On one side, this trend is driven by technology scaling which enables ever increasing levels of integration. Moreover, also the highly cost driven nature of the automotive industry forces developers to reduce the total number of ECUs per vehicle.

In this context, electronics play an increasing role in providing advanced driving assistance functions that particularly help to prevent hazards and reduce the number of fatal injuries.

The integration of assistance functions inside an ECU is mainly concentrated around a multi-CPU microcontroller that plays a decisive role by hosting the critical computation and control functions. Such a multi-CPU microcontroller may be regarded as a cluster of computation nodes with defined and encapsulated tasks.

Under such assumptions—i.e. that a plurality of critical computation and control functions related to various assistance functions are performed by the same multi-CPU microcontroller—early detection of latent faults is a main concern to address to avoid issues where the operation of the multi-CPU microcontroller is actually affected.

A typical cause of such errors may be the corruption of CPU registers by effects such as alpha particle strike, power supply spikes or the like which may be summarized as latent faults. As a result, any such corruption will lead to unexpected operation of the CPU when the register contents are next used. This is based on the fact that a typical CPU contains many registers holding the current state of the CPU which determines its future operation. Consequently, embodiments aim at a method and system for detecting corrupted registers prior to use of these registers by the CPU.

Moreover, the CPU registers may be architectural registers that are visible to a program running on the CPU or may be "hidden" registers used by the CPU to control operation but not visible to a program, e.g. registers in the branch prediction tables.

As both types of registers may see long periods of time between accesses during which they are susceptible to corruption, the susceptibility of the corresponding CPU to latent faults increases.

Typical solutions for detecting corrupted registers comprise the following solutions. A first known solution is based on a read out of architecturally visible registers by a program running on the CPU and comparing the value with a known good value held elsewhere in the system. This requires a known good value to be available. However, for registers that are dynamically updated such a value may not be available.

A further problem with this solution is that having a program read out the architectural state is invasive and will consume CPU resources to perform. Moreover, hidden registers are typically not visible to the program and hence cannot be compared.

A second known solution is based on the use of at least two lockstepped CPUs. Lockstepped CPUs allow corruption to be detected when such corruption leads to the operation of the two CPUs diverging. However, this diverging operation may be detectable only some time after the corruption actually occurred and then it may be too late for the system to recover from such corruption.

For these or other reasons, there is a need for the present invention.

SUMMARY

A method and system for detection of latent faults in microcontrollers is provided, substantially as shown in and/or described in connection with at least one of the figures, as set forth more completely in the claims.

Further features and advantages of embodiments will become apparent from the following detailed description made with reference to the accompanying drawings.

BRIEF DESCRIPTION OF THE DRAWINGS

The accompanying drawings are included to provide a further understanding and are incorporated in and constitute a part of this specification. The drawings relate to examples and embodiments and together with the description serve to explain the principles of the invention. Other embodiments and many of the intended advantages of embodiments will be readily appreciated as they become better understood by reference to the following detailed description.

DETAILED DESCRIPTION

Figure 1:
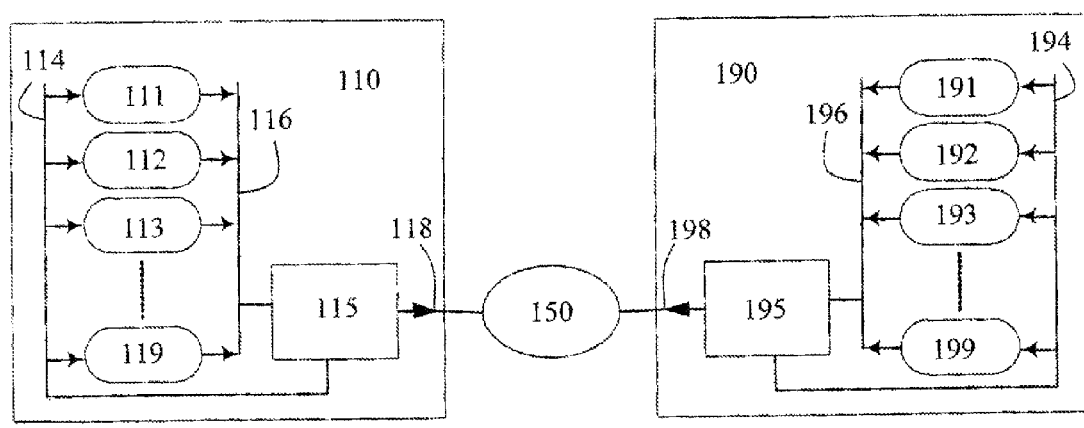
FIG. 1 shows an embodiment of a system for a CPU state register scan in two lockstepped CPUs to detect latent faults.

In the following Detailed Description, reference is made to the accompanying drawings, which form a part hereof, and in which are shown by way of illustration specific embodiments. It is to be understood that other embodiments may be utilized and structural or other changes may be made without departing from the scope of the present invention. The following detailed description, therefore, is not to be taken in a limiting sense, and the scope of the present invention is defined by the appended claims.

In the following, for illustration purposes, the invention will be described with reference to microcontrollers in automotive electronic control units. However, the invention is not so limited and may find its application in conjunction with any other type of fault detection for microcontrollers.

One issue regarding multi-CPU or multi-core microcontrollers is system integrity. A prerequisite for the system integrity is that latent errors are detected before they may corrupt the further operation of the multi-CPU or multi-core microcontrollers.

For high integrity safety microcontrollers, the state of the art with regard to system integrity is to use duplex systems for a computation cluster, also known as lockstep execution of two CPUs. The lockstep execution of the CPUs describes the fact that e.g. two CPUs execute the same process delayed by—for instance—two clock cycles to mitigate common cause failures.

Hence, in case of an error in a first lockstep CPU—in the above example—there is also at least a two clock cycle delay to detect the error. This is caused by the fact that the error is typically detected by comparison of a consequently two clock cycles delayed output of a second lockstep CPU with a delayed output of the first lockstep CPU. However, in the meantime until the error is detected it may be too late for the system of lockstep CPUs to recover from the corruption of the CPU registers.

Hence, embodiments relate to a novel system and method for the detection of state register corruptions in CPUs or microcontrollers preferably before these corruptions affect the further operation of the CPUs or microcontrollers and without intervening with the normal operation of the CPUs or microcontrollers.

Nowadays, automotive ECUs are typically built in a way that a critical error leads to entering a fail safe mode. However, in such situations, the process of entering the normal mode again is barely defined. In other words, error recovery is just in definition today.

Since the real complexity of the above-mentioned driving assistance functions is typically reflected in the complexity of the supporting software, there has been no focus in research and development so far on the corresponding microcontroller architecture and its ability to support the error recovery e.g. by early detection of latent faults. Accordingly, no circuit is available today to allow detection of CPU state register corruptions before they affect the further operation of the CPU in a real application.

Therefore, embodiments comprise a system and method adapted to allow architectural and hidden registers of a multi-CPU microcontroller to be read in a non-invasive way. The result of the read access may be passed to an output for comparison, for instance, in a lockstepped system. For that purpose, embodiments may comprise an internal bus system in each CPU of the multi-CPU microcontroller allowing every register, i.e. architectural and hidden, to be read.

In one embodiment each register may be given a unique access address on the internal bus and may be read without perturbing the state of the multi-CPU microcontroller or interfering with the normal operation of the multi-CPU microcontroller.

A sequencer may be used to read each register in turn and put the result on a dedicated CPU scan output. The multi-CPU microcontroller may be used in a lockstepped system and the scan output may be compared with the identical scan output on the corresponding CPU of a lockstepped pair of CPUs.

The sequencer may be used to repetitively scan the registers of the multi-CPU microcontroller, allowing latent faults to be discovered before a further use of the registers leads to system failure. The rate at which the registers are scanned may be varied to balance access frequency with power consumption and failure reaction time. Critical registers may be read more frequently than non-critical registers of the multi-CPU microcontroller in one embodiment.

As indicated before, this error detection is typically performed on the basis of delayed processing of the same input signal by at least one second CPU, such as in a delayed duplex system, and on the basis of a subsequent comparison of appropriate output signals of the first CPU and the at least one second CPU to generate a corresponding error signal.

FIG. 1 shows an embodiment of a system for CPU register scan in two lockstepped CPUs to detect latent faults. In this system, a first CPU 110 comprises a first CPU state register 111, a second CPU state register 112, a third CPU state register 113, and an n-th CPU state register 119. In the context of the embodiment in FIG. 1, all CPU registers are referred to as "CPU state registers". However—although all registers of a CPU characterize its current state in a broader sense—some of the above mentioned state registers need not to be "CPU state" registers in a strict sense.

As expressed before, any of the CPU state registers 111, 112, 113, 119 may be an architectural register that is visible to a program running on the first CPU 110 or may be a "hidden" register used by the first CPU 110 to control its operation but is not visible to a program.

In any case, each of the CPU state registers 111, 112, 113, 119 may be accessed by a unique register address on the address bus part 114 of a non-invasive read bus. In response to such access, a corresponding one of the CPU state registers 111, 112, 113, 119 may transmit its data content via a data bus part 116 of the non-invasive read bus to a dedicated CPU scan output 118 of the first CPU 110. In one embodiment, the non-invasive read bus may comprise a separate bus within the first CPU 110 that enables access to the CPU state registers 111, 112, 113, 119 without affecting the state of the first CPU 110 or interfering with the normal operation of the first CPU 110.

As in the embodiment of FIG. 1, a sequencer 115 within the first CPU 110 may be used to read each of the first 111, the second 112, the third 113 and the n-th CPU state register 119 of the first CPU 110 in turn and put the result on the dedicated CPU scan output 118 of the first CPU 110. Moreover, in one embodiment the sequencer 115 may be configured to vary the frequency or sequence in which the first 111, the second 112, the third 113 and the n-th CPU state register 119 of the first CPU 110 are accessed to balance access frequency and failure reaction time between more or less critical ones of the CPU state registers 111, 112, 113, 119.

Additionally, the embodiment in FIG. 1 comprises a second CPU 190 that operates in a lockstepped mode with the first CPU 110. In other words, the second CPU 190 provides a redundant CPU operating on the same input data as the first CPU 110 to enable a comparing of contents of sets of according registers of the first 110 and the second CPU 190 to detect corrupted register contents.

The second CPU 190 comprises a first CPU state register 191, a second CPU state register 192, a third CPU state register 193 and an n-th CPU state register 199.

Also with regard to the second CPU 190, any of the CPU state registers 191, 192, 193, 199 may be an architectural register that is visible to a program running on the second CPU 190 or may be a "hidden" register used by the second CPU 190 to control its operation but not visible to a program.

Similar to the first CPU 110, each of the CPU state registers 191, 192, 193, 199 may be accessed by a unique register address on an address bus part 194 of a further non-invasive read bus. In response to such access, a corresponding one of the CPU state registers 191, 192, 193, 199 may transmit its data content via a data bus part 196 of the further non-invasive read bus to a dedicated CPU scan output 198 of the second CPU 190. In one embodiment, the non-invasive read bus may comprise a separate bus within the second CPU 190 that enables access to the CPU state registers 191, 192, 193, 199 without affecting the state of the second CPU 190 or interfering with the normal operation of the second CPU 190.

As in the embodiment of FIG. 1, a further sequencer 195 within the second CPU 190 may be used to read each of the first 191, the second 192, the third 193 and the n-th CPU state register 199 of the second CPU 190 in turn and put the read result on the dedicated CPU scan output 198 of the second CPU 190. Moreover, the sequencer 195 may be configured to vary the frequency or sequence in which the first 191, the second 192, the third 193 and the n-th CPU state register 199 of the second CPU 190 are accessed to balance access frequency and failure reaction time between more or less critical ones of the CPU state registers 191, 192, 193, 199.

FIG. 1 shows that a comparator 150 may connect the dedicated CPU scan output 118 of the first CPU 110 with the dedicated CPU scan output 198 of the second CPU 190. In this way, the comparator 150 may be used to compare contents of sets of according registers of the first CPU 110 and the second CPU 190 to detect corrupted register contents. For instance, the content of the first register 111 of the first CPU 110 may be compared with the content of the first register 191 of the second CPU 190, the content of the second register 112 of the first CPU 110 may be compared with the content of the second register 192 of the second CPU 190, the content of the third register 113 of the first CPU 110 may be compared with the content of the third register 193 of the second CPU 190 and the content of the n-th register 119 of the first CPU 110 may be compared with the content of the n-th register 199 of the second CPU 190. As part of this process for the detection of a latent fault, a port of the dedicated CPU scan output 118 of the first CPU 110 may be compared with the corresponding lockstepped port of the dedicated CPU scan output 198 of the second CPU 190.

For that purpose, the first CPU 110 and the second CPU 190 may operate in a lockstepped system. I.e. the second CPU 190 may execute the same process as the first CPU 110 delayed by—for instance—two clock cycles. In this way, the likelihood is increased that the second CPU 190 is not affected in the same way as the first CPU 110 by the effect causing the register corruption.

Hence, a CPU state register may be detected as corrupted whenever the above mentioned comparison of corresponding registers of the lockstepped first 110 and second CPU 190 executing the same process with the same input data results in inconsistent CPU state register contents of the according registers. To prevent a corruption of a CPU state register from affecting the further operation of the corresponding CPU, both the first CPU 110 and the second CPU 190 may be reset to a scan state without any register inconsistency between the first CPU 110 and the second CPU 190 and instructed to repeat the instructions executed up to the point in time when the register corruption occurred. In alternative embodiments, the correct one of inconsistent CPU state register contents could be determined by a majority decision between according registers of three or more lockstepped CPUs to replace the incorrect CPU state register content in the corresponding CPU state register before any further process command is executed on the corresponding set of lockstepped CPUs.

Figure 2:
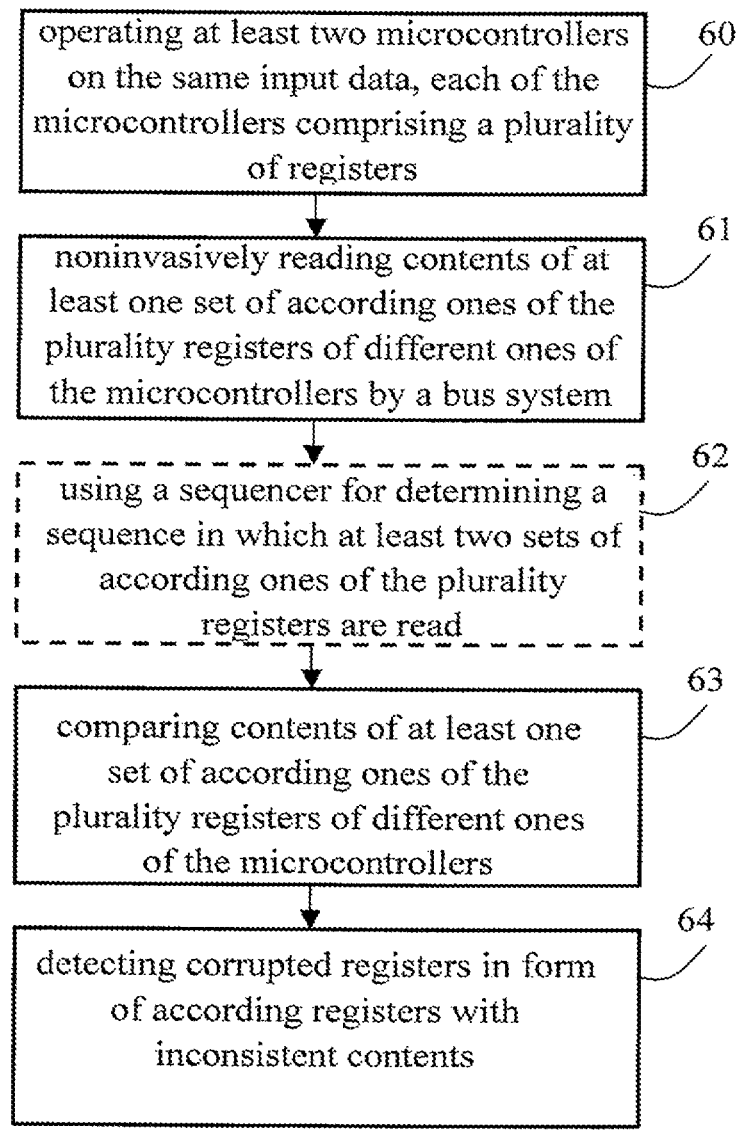
FIG. 2 shows an embodiment of a method for detecting register corruption of redundant CPUs operating on the same input data.

FIG. 2 shows an embodiment of a method for detecting register corruption of redundant CPUs operating on the same input data, i.e. on the same set of instructions and data. In step 60 of the method, at least two microcontrollers may operate on the same input data. Each of the microcontrollers may comprise a plurality of registers.

In step 61 of the method, contents of at least one set of according ones of the plurality registers of different ones of the microcontrollers may be read by a bus system.

Moreover, in optional step 62 of the method as shown in FIG. 2, a sequencer may be used for determining a sequence in which at least two sets of according ones of the plurality registers are read.

In a further step 63 of the method as shown in FIG. 2, contents of at least one set of according ones of the plurality registers of different ones of the microcontrollers may be compared.

In step 64 of the method, as a result of the above comparison, corrupted registers of the microcontrollers may be detected in the form of according registers with inconsistent contents.

With respect to the above-described embodiments which relate to the Figures, it is emphasized that the embodiments basically serve to increase the comprehensibility. In addition to that, the following further embodiments try to illustrate a more general concept. However, also the following embodiments are not to be taken in a limiting sense. Rather—as expressed before—the scope of the present invention is defined by the appended claims.

In this regard, a first embodiment relates to a system for detecting register corruption of redundant CPUs operating on the same input data comprising a separate bus in each of the redundant CPUs to read at least one predetermined register of the respective one of the redundant CPUs in a non-invasive way. This embodiment comprises a comparator to compare contents of at least one set of according registers of different ones of the redundant CPUs to detect corrupted register contents.

One embodiment further comprises a sequencer in each of the redundant CPUs to determine a frequency in which the at least one predetermined register is read and/or a sequence in which at least two predetermined registers of the respective one of the redundant CPUs are read.

In one embodiment, the redundant CPUs are lockstepped CPUs.

In a further embodiment, the separate bus in each of the redundant CPUs is configured to non-invasively access all architectural and at least a subset of the hidden registers of the respective one of the redundant CPUs.

In one embodiment, each sequencer is configured to read at least one critical one of the at least one predetermined register more frequently than less critical registers.

In another embodiment, each sequencer is configured to read at least one critical one of the at least one predetermined register in response to a predetermined event.

A further embodiment relates to a system comprising at least two microcontrollers operating on the same input data. In this system, each of the microcontrollers comprises a plurality of registers controlling the operation of a respective one of the microcontrollers.

Moreover, this system comprises a bus system to non-invasively read and compare contents of at least one set of according ones of the plurality registers of different ones of the microcontrollers to detect corrupted registers in form of according registers with inconsistent contents.

In one embodiment, the system is configured to output and compare at least one read access address to the access address initiating a corresponding non-invasive read access by the bus system to a corresponding one of the plurality registers to ensure that no corruption of a corresponding address field has occurred during the corresponding non-invasive read access.

One embodiment further comprises a sequencer to determine a frequency in which the at least one set of according ones of the plurality registers is read and/or a sequence in which at least two sets of according ones of the plurality registers are read.

In one embodiment, the sequencer is configured to be throttled to read the at least one set of according ones of the plurality registers only every n-th clock cycle of the microcontrollers to reduce power consumption, wherein n is a predetermined natural number with n≥2.

A further embodiment comprises a comparator to compare the contents of at the at least one set of according ones of the plurality registers of the different ones of the microcontrollers. In this embodiment, each of the microcontrollers comprises an output port to output contents of the plurality registers of the corresponding one of the microcontrollers non-invasively read by the bus system.

Moreover, according to this embodiment, the plurality of registers are m-bits wide, wherein the width of the output port is only m/n-bit wide which provides a reduced width of the comparator to further reduce power consumption. In this embodiment, m is a predetermined natural number with m=n·i, and i is a predetermined natural number with i≥2.

A still further embodiment relates to a system for detecting register corruption within CPUs operating on the same input data comprising means for non-invasive read access to and comparison of contents of at least one set of according ones of registers of different CPUs to detect corrupted registers in the form of according registers with inconsistent contents.

In one embodiment, the means comprises at least one bus providing the non-invasive read access to the registers, at least one sequencer controlling a frequency and/or sequence of the non-invasive read access and a comparator for the comparison of the contents of the registers. Moreover, in this system, each of the CPUs comprises a scan output to output the contents of the registers of the corresponding one of the CPUs to the comparator.

In one embodiment, the system is configured to read and output contents of a plurality of registers of the CPUs in each clock cycle of the CPUs by dividing the plurality of registers in multiple sub-blocks.

In a further embodiment, the system is configured to vary a speed of the non-invasive read access dependent on a required failure reaction time of an application of the CPUs.

A further embodiment relates to a method for detecting register corruption of redundant CPUs operating on the same input data. This method comprises the step of non-invasively reading at least one predetermined register of the respective one of the redundant CPUs by a separate bus in each of the redundant CPUs.

Moreover, the method comprises the step of comparing contents of at least one set of according registers of different ones of the redundant CPUs by a comparator to detect corrupted register contents.

In one embodiment of the method, non-invasively reading comprises using a sequencer in each of the redundant CPUs to determine a frequency in which the at least one predetermined register is read and/or a sequence in which at least two predetermined registers of the respective one of the redundant CPUs are read.

According to one embodiment, the redundant CPUs are lockstepped CPUs.

In one embodiment, the separate bus in each of the redundant CPUs is configured to non-invasively access all architectural and at least a subset of the hidden registers of the respective one of the redundant CPUs.

In a further embodiment, using the sequencer comprises reading at least one critical one of the at least one predetermined registers more frequently.

A further embodiment relates to a method comprising the step of operating at least two microcontrollers on the same input data. In this method, each of the microcontrollers comprises a plurality of registers controlling the operation of a respective one of the microcontrollers.

Moreover, this method comprises the step of non-invasively reading and comparing contents of at least one set of according ones of the plurality registers of different ones of the microcontrollers by a bus system to detect corrupted registers in form of according registers with inconsistent contents.

One embodiment further comprises the steps of outputting and comparing at least one read access address to the access address initiating a corresponding non-invasive read access by the bus system to a corresponding one of the plurality registers to ensure that no corruption of a corresponding address field has occurred during the corresponding non-invasive read access.

In one embodiment, non-invasively reading comprises using a sequencer for determining a frequency in which the at least one set of according ones of the plurality registers is read and/or a sequence in which at least two sets of according ones of the plurality registers are read.

In a further embodiment, using the sequencer comprises throttling the non-invasively reading to read the at least one set of according ones of the plurality registers only every n-th clock cycle of the microcontrollers to reduce power consumption, wherein n is a predetermined natural number with n≥2.

A still further embodiment relates to a method for detecting CPU register corruption by redundant CPUs operating on the same input data. This method comprises the step of non-invasively reading and comparing contents of at least one set of according ones of CPU registers of different ones of the redundant CPUs to detect corrupted CPU registers in form of according CPU registers with inconsistent contents.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for detecting register corruption of redundant CPUs operating on the same input data comprising:
    a separate bus in each of the redundant CPUs, each bus configured to read at least one predetermined register of the respective one of the redundant CPUs in a non-invasive way; and
    a comparator to compare contents of at least one set of according registers of different ones of the redundant CPUs to detect corrupted register contents,
    wherein each of the CPUs comprises an output port to output contents of the at least one predetermined register of the corresponding one of the CPUs non-invasively read by the respective separate bus, wherein the predetermined registers are m-bit wide, wherein the width of the output port is m/n-bit wide providing a reduced width for the comparator to compare the contents of the at least one predetermined register of different ones of the CPUs to detect corrupted registers in the form of according registers with inconsistent contents, wherein m is a predetermined natural number with m=n·i, and is a predetermined natural number with i≥2.

2. The system of claim 1, further comprising a sequencer in each of the redundant CPUs, each sequencer configured to determine a frequency in which the at least one predetermined register is read and/or a sequence in which at least two predetermined registers of the respective one of the redundant CPUs are read.

3. The system of claim 1, wherein the redundant CPUs are lockstepped CPUs.

4. The system of claim 1, wherein the separate bus in each of the redundant CPUs is configured to non-invasively access all architectural and at least a subset of the hidden registers of the respective one of the redundant CPUs.

5. The system of claim 2, wherein each sequencer is configured to read at least one critical one of the at least one predetermined register more frequently than other, non-critical registers.

6. The system of claim 2, wherein each sequencer is configured to read at least one critical one of the at least one predetermined register in response to a predetermined event.

7. A system comprising:
- at least two microcontrollers operating on the same input data, each of the microcontrollers comprising a plurality of registers controlling the operation of a respective one of the microcontrollers; and
- a bus system configured to non-invasively read at least one set of according ones of the plurality of registers of different ones of the microcontrollers;
- wherein each of the microcontrollers comprises an output port to output contents of the plurality registers of the corresponding one of the microcontrollers non-invasively read by the bus system, wherein the plurality of registers are m-bit wide, wherein the width of the output port is m/n-bit wide providing a reduced width for a comparator to compare the contents of the at least one set of according ones of the plurality of registers of different ones of the microcontrollers to detect corrupted registers in the form of according registers with inconsistent contents, wherein m is a predetermined natural number with $m = n \cdot i$, and i is a predetermined natural number with $i \geq 2$.

8. The system of claim 7, wherein the bus system is configured to output and compare at least one read access address to the access address initiating a corresponding non-invasive read access by the bus system to a corresponding one of the plurality registers to ensure that no corruption of a corresponding address field has occurred during the corresponding non-invasive read access.

9. The system of claim 7, further comprising at least two sequencers associated with the at least two microcontrollers, respectively, each sequencer configured to determine a frequency in which the at least one set of according ones of the plurality registers is read and/or a sequence in which at least two sets of according ones of the plurality registers are read.

10. The system of claim 9, wherein each sequencer is configured to be throttled to read the at least one set of according ones of the plurality registers only every n-th clock cycle of the microcontrollers to reduce power consumption, wherein n is a predetermined natural number with $n \geq 2$.

11. A system for detecting register corruption within CPUs operating on the same input data comprising:
- at least two CPUs operating on the same input data; and
- means for non-invasive read access to contents of at least one set of according ones of registers of the at least two CPUs to detect corrupted registers in the form of according registers with inconsistent contents,
- wherein each of the CPUs comprises an output port to output contents of the respective registers of the corresponding one of the CPUs non-invasively read by the means, wherein the respective registers are m-bit wide, wherein the width of the output port is m/n-bit wide providing a reduced width for a comparison means to compare the contents of the at least one set of according ones of registers of different ones of the CPUs to detect corrupted registers in the form of according registers with inconsistent contents, wherein m is a predetermined natural number with $m = n \cdot i$, and i is a predetermined natural number with $i \geq 2$.

12. The system of claim 11, wherein the means comprises at least one bus providing the non-invasive read access to the registers, at least one sequencer controlling a frequency and/or sequence of the non-invasive read access and a comparator for the comparison of the contents of the registers, each of the CPUs comprising a scan output to output the contents of the registers of the corresponding one of the CPUs to the comparator.

13. The system of claim 11, wherein the means is configured to read and output contents of a plurality of registers of the CPUs in each clock cycle of the CPUs by dividing the plurality of registers in multiple sub-blocks.

14. The system of claim 11, wherein the means is configured to vary a speed of the non-invasive read access dependent on a required failure reaction time of an application of the CPUs.

15. A method for detecting register corruption of redundant CPUs operating on the same input data comprising:
- non-invasively reading at least one predetermined register of the respective one of the redundant CPUs by a separate bus in each of the redundant CPUs; and
- comparing contents of at least one set of according read registers of different ones of the redundant CPUs by a comparator to detect corrupted register contents,
- wherein each of the CPUs comprises an output port to output contents of the at least one predetermined register of the respective one of the redundant CPUs non-invasively read by the respective separate bus, wherein each register is m-bit wide, wherein the width of the output port is m/n-bit wide providing a reduced width for the comparator for comparing the contents of the at least one set of according ones of the read registers of different ones of the redundant CPUs to detect corrupted registers in the form of according registers with inconsistent contents, wherein m is a predetermined natural number with $m = n \cdot i$, and i is a predetermined natural number with $i \geq 2$.

16. The method of claim 15, wherein non-invasively reading comprises using a sequencer in each of the redundant CPUs to determine a frequency in which the at least one predetermined register is read and/or a sequence in which at least two predetermined registers of the respective one of the redundant CPUs are read.

17. The method of claim 15, wherein the redundant CPUs are lockstepped CPUs.

18. The method of claim 15, wherein the separate bus in each of the redundant CPUs is configured to non-invasively access all architectural and at least a subset of the hidden registers of the respective one of the redundant CPUs.

19. The method of claim 16, wherein using the sequencer comprises reading at least one critical one of the at least one predetermined register more frequently.

20. A method comprising:
- operating at least two microcontrollers on the same input data, each of the microcontrollers comprising a plurality of registers controlling the operation of a respective one of the microcontrollers; and
- non-invasively reading and comparing contents of at least one set of according ones of the plurality registers of different ones of the microcontrollers by a bus system to detect corrupted registers in the form of according registers with inconsistent contents,
- wherein each of the microcontrollers comprises an output port to output contents of the plurality of registers of the corresponding one of the microcontrollers non-invasively read by the bus system, wherein the plurality of registers are m-bit wide, wherein the width of the output port is m/n-bit wide providing a reduced width for a comparator for comparing the contents of the at least one set of according ones of the plurality of registers of different ones of the microcontrollers to detect corrupted registers in the form of according registers with inconsistent contents, wherein m is a predetermined natural number with m=n·i, and i is a predetermined natural number with i≥2.

21. The method of claim 20, further comprising outputting and comparing at least one read access address to the access address initiating a corresponding non-invasive read access by the bus system to a corresponding one of the plurality registers to ensure that no corruption of a corresponding address field has occurred during the corresponding non-invasive read access.

22. The method of claim 20, wherein non-invasively reading comprises using a sequencer for determining a frequency in which the at least one set of according ones of the plurality registers is read and/or a sequence in which at least two sets of according ones of the plurality registers are read.

23. The method of claim 21, wherein using the sequencer comprises throttling the non-invasively reading to read the at least one set of according ones of the plurality registers only every n-th clock cycle of the microcontrollers to reduce power consumption, wherein n is a predetermined natural number with n≥2.

24. A method for detecting CPU register corruption by redundant CPUs operating on the same input data comprising:
    non-invasively reading at least one set of according ones of CPU registers of different ones of the redundant CPUs; and
    comparing contents of the at least one set of according one of CPU registers to detect corrupted CPU registers in the form of according CPU registers with inconsistent contents,
    wherein each of the CPUs comprises an output port to output contents of the at least one set of according ones of CPU registers of the corresponding ones of the CPUs non-invasively read, wherein each CPU register is m-bit wide, wherein the width of the output port is m/n-bit wide providing a reduced width for a comparator for comparing the contents of the at least one set of according ones of the CPU registers of different ones of the CPUs to detect corrupted registers in the form of according registers with inconsistent contents, wherein m is a predetermined natural number with m=n·i, and i is a predetermined natural number with i≥2.

* * * * *

UNITED STATES PATENT AND TRADEMARK OFFICE
CERTIFICATE OF CORRECTION

| | |
|---|---|
| PATENT NO. | : 8,954,794 B2 |
| APPLICATION NO. | : 13/488571 |
| DATED | : February 10, 2015 |
| INVENTOR(S) | : Neil Hastie et al. |

Page 1 of 1

It is certified that error appears in the above-identified patent and that said Letters Patent is hereby corrected as shown below:

In the Claims,

Column 8, Claim 1, Line 54 Please replace "...number with $m = n \cdot i$, and is" with --...number with $m = n \cdot i$, and i is--

Signed and Sealed this
Nineteenth Day of May, 2015

Michelle K. Lee
*Director of the United States Patent and Trademark Office*